United States Patent
Cook

(10) Patent No.: US 10,876,676 B2
(45) Date of Patent: Dec. 29, 2020

(54) GIMBAL WITH ENHANCED RING ASSEMBLY FOR RAPID TOOL INTERCHANGE

(71) Applicant: The Boeing Company, Chicago, IL (US)

(72) Inventor: Rebecca Leigh Cook, North Charleston, SC (US)

(73) Assignee: The Boeing Company, Chicago, IL (US)

( * ) Notice: Subject to any disclaimer, the term of this patent is extended or adjusted under 35 U.S.C. 154(b) by 361 days.

(21) Appl. No.: 15/876,703

(22) Filed: Jan. 22, 2018

(65) Prior Publication Data

US 2019/0226628 A1 Jul. 25, 2019

(51) Int. Cl.
| *F16M 11/04* | (2006.01) |
| *F16B 2/10* | (2006.01) |
| *F16M 11/12* | (2006.01) |

(52) U.S. Cl.
CPC ............ *F16M 11/041* (2013.01); *F16B 2/10* (2013.01); *F16M 11/12* (2013.01)

(58) Field of Classification Search
CPC ......... F16M 11/041; F16M 11/12; F16B 2/10; B25H 1/0021; B25H 1/0028; B25H 5/00; G03B 17/561; G03B 17/563
USPC ......... 248/124.1, 125.1, 219.1, 227.3, 229.1, 248/540, 62, 74.1, 229.23, 229.13, 315, 248/313, 583, 278.1, 280.11, 282.1, 248/284.1, 51, 52; 348/373, 375, 157; 396/428, 352, 140, 243
See application file for complete search history.

(56) References Cited

U.S. PATENT DOCUMENTS

| 1,678,529 | A | * | 7/1928 | Peters | ..................... | E04H 12/32 |
| | | | | | | 116/174 |
| 4,733,839 | A | * | 3/1988 | Gehris | ................... | G01C 19/16 |
| | | | | | | 248/180.1 |
| 5,353,167 | A | * | 10/1994 | Kuklo | .................. | G02B 7/1825 |
| | | | | | | 248/485 |
| 5,360,196 | A | * | 11/1994 | DiGiulio | ................ | F16M 13/04 |
| | | | | | | 224/908 |
| 5,435,515 | A | * | 7/1995 | DiGiulio | ................ | F16M 11/10 |
| | | | | | | 224/908 |
| 6,202,968 | B1 | * | 3/2001 | Lehr | ....................... | F16C 11/06 |
| | | | | | | 248/278.1 |
| 7,114,689 | B2 | * | 10/2006 | Anderson, II | ............ | F16L 3/16 |
| | | | | | | 248/278.1 |

(Continued)

FOREIGN PATENT DOCUMENTS

WO 2010030404 A1 3/2010

OTHER PUBLICATIONS

European Search Report; Application No. 18207767.7-1009; dated Nov. 5, 2019.

*Primary Examiner* — Terrell L McKinnon
*Assistant Examiner* — Michael McDuffie
(74) *Attorney, Agent, or Firm* — Duft & Bornsen, PC

(57) ABSTRACT

Systems and methods for switching tools in an enhanced ring assembly of a gimbal. One embodiment is a gimbal that includes an outer ring and an inner ring. The outer ring is attached to an arm and includes a first hinge to open and close the outer ring, and also a first latch to fasten the outer ring in a closed position. The inner ring is rotatably supported within the outer ring and includes a second hinge to open and close the inner ring, and a second latch to fasten the inner ring in a closed position.

20 Claims, 5 Drawing Sheets

(56) References Cited

U.S. PATENT DOCUMENTS

| | | | | |
|---|---|---|---|---|
| 7,261,263 B2* | 8/2007 | Baker | ................... | A47F 5/04 |
| | | | | 24/24 |
| 8,540,196 B1* | 9/2013 | Hodson | ................ | F16L 3/012 |
| | | | | 248/121 |
| 8,827,216 B2* | 9/2014 | Brown | ................ | B25H 1/0021 |
| | | | | 248/124.1 |
| 9,033,292 B2* | 5/2015 | Lu | ................... | F16M 13/022 |
| | | | | 248/123.11 |
| 2010/0188479 A1* | 7/2010 | Bordignon | ........... | F16M 11/041 |
| | | | | 348/36 |
| 2011/0206453 A1* | 8/2011 | Shelef | ................ | F16M 11/041 |
| | | | | 403/404 |
| 2011/0240824 A1 | 10/2011 | Wade | | |
| 2013/0075540 A1* | 3/2013 | Hammond | ............ | F16L 3/1008 |
| | | | | 248/62 |
| 2017/0048439 A1* | 2/2017 | von Borcke-Morawitz | ................ | |
| | | | | B64D 47/08 |
| 2017/0217009 A1* | 8/2017 | Angold | ................ | B25H 1/0021 |
| 2017/0301326 A1* | 10/2017 | Truda | ................... | G10G 7/00 |
| 2019/0383431 A1* | 12/2019 | Magagna | ................ | F16B 2/10 |

\* cited by examiner

GIMBAL WITH ENHANCED RING ASSEMBLY FOR RAPID TOOL INTERCHANGE

FIELD

The disclosure relates to the field of mechanical supports, and more particularly, to the field of gimbals.

BACKGROUND

Technicians such as aircraft mechanics frequently use a gimbal that provides pivoted support of a power tool. The gimbal may attach to an arm having springs or pneumatics which can support most or all of the weight of the tool. At the end of the arm, the gimbal includes a ring that fits around the tool body to secure the tool. A gimbal therefore provides safe and accurate tool positioning, particularly in factory environments where repetitive lifting of heavy tools is performed.

One particular drawback of current gimbals, however, is that it takes a technician a long time to swap out tools in the ring. It is not uncommon in aircraft assembly, for instance, for a technician to switch out drills every three or four holes. To swap out for a new drill, the technician disassembles the ring by unscrewing a series of screws with a screwdriver, removes the first drill, and reassembles the ring around the second drill. Reassembly of the ring is cumbersome because it involves coordinating the pieces of the ring together around the second drill by hand while reinstalling the screws with the screwdriver to secure the second drill in the gimbal. Thus, there is a need for a gimbal with an improved ability to switch between tools in the gimbal.

SUMMARY

Embodiments described herein provide a gimbal with an enhanced ring assembly for switching tools. The gimbal includes concentric rings that enclose around the body of a tool. The outer ring is attached to an end of the gimbal arm and the inner ring is able to rotate inside the outer ring for rotational positioning of a tool (e.g., a power tool). Each ring includes a hinge and latch configuration that enables the rings to remain intact when opened to switch out tools. The hinges and latches are positioned such that when the rings are closed again around a new tool, the rotation of the inner ring inside the outer ring is not interrupted.

One embodiment is an apparatus comprising a gimbal. The gimbal includes an outer ring attached to an arm, the outer ring including a first hinge to open and close the outer ring, and a first latch to fasten the outer ring in a closed position. The gimbal further includes an inner ring rotatably supported within the outer ring, the inner ring including a second hinge to open and close the inner ring, and a second latch to fasten the inner ring in a closed position.

A further embodiment is a method for changing a tool in a gimbal. The method includes opening an outer ring via a first latch and a first hinge to release an inner ring rotatably supported in the outer ring, and opening the inner ring via a second latch and a second hinge. The method also includes removing a first tool from the inner ring, and positioning a second tool in the inner ring. The method further includes closing the inner ring via the second latch and the second hinge, and closing the outer ring around the inner ring via the first latch and the first hinge.

Yet another embodiment is ring assembly of a gimbal. The ring assembly includes an outer ring having wheels situated around an inner circumference of the outer ring, a first hinge mounted to the outer ring, and a first latch mounted to the outer ring. The ring assembly includes an inner ring having a track around an outer circumference of the inner ring, the track sized to receive the wheels to rotate the inner ring inside the outer ring, a second hinge mounted to the inner ring, and a second latch mounted to the inner ring.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
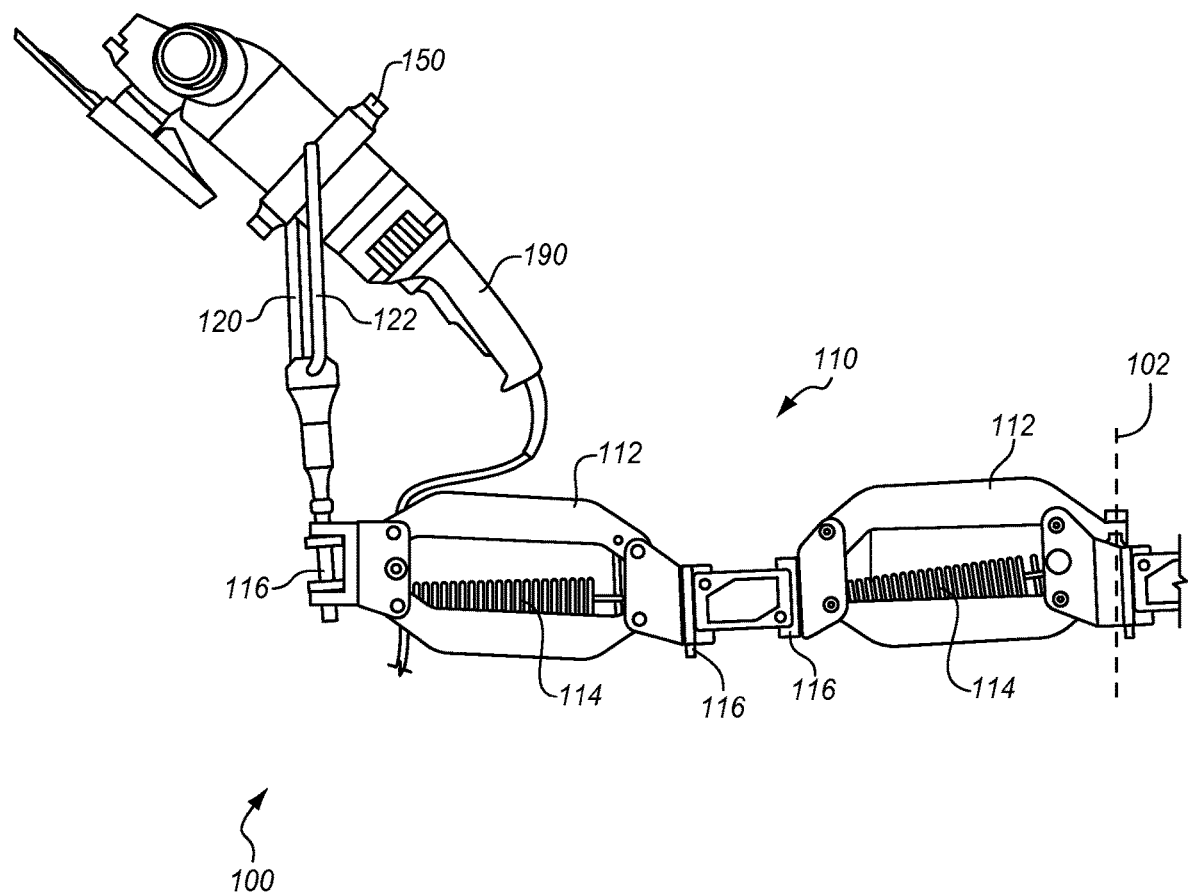
FIG. 1 shows a gimbal in an illustrative embodiment.

FIG. 1 shows a gimbal 100 in an illustrative embodiment. The gimbal 100 includes a ring assembly 150 attached to an arm assembly 110 which together provide pivoted support of a tool 190. The tool 190 may include a power tool such as a drill or cutter. In general, the arm assembly 110 is operable to pivot about at least one axis 102 and may include one or more levers 112, springs 114 (and/or pneumatics), and hinges 116 (and/or bearings) to bear the weight of an object (e.g., the tool 190) while articulating through a range of motions. The arm assembly 110 also includes a support member 120 having one or multiple prongs to connect with the ring assembly 150 at one or multiple joints 122. The ring assembly 150 may be removably attached at one end of the arm assembly 110 with ability to swivel or pivot when attached at the joint(s) 122 for precise positioning of the tool 190. The gimbal 100 therefore provides ergonomic support of the tool 190 while enabling a technician to situate the tool 190 in virtually any position. The structure of the gimbal 100 discussed herein is an example for purpose of discussion, and other structures are possible.

Figure 2:
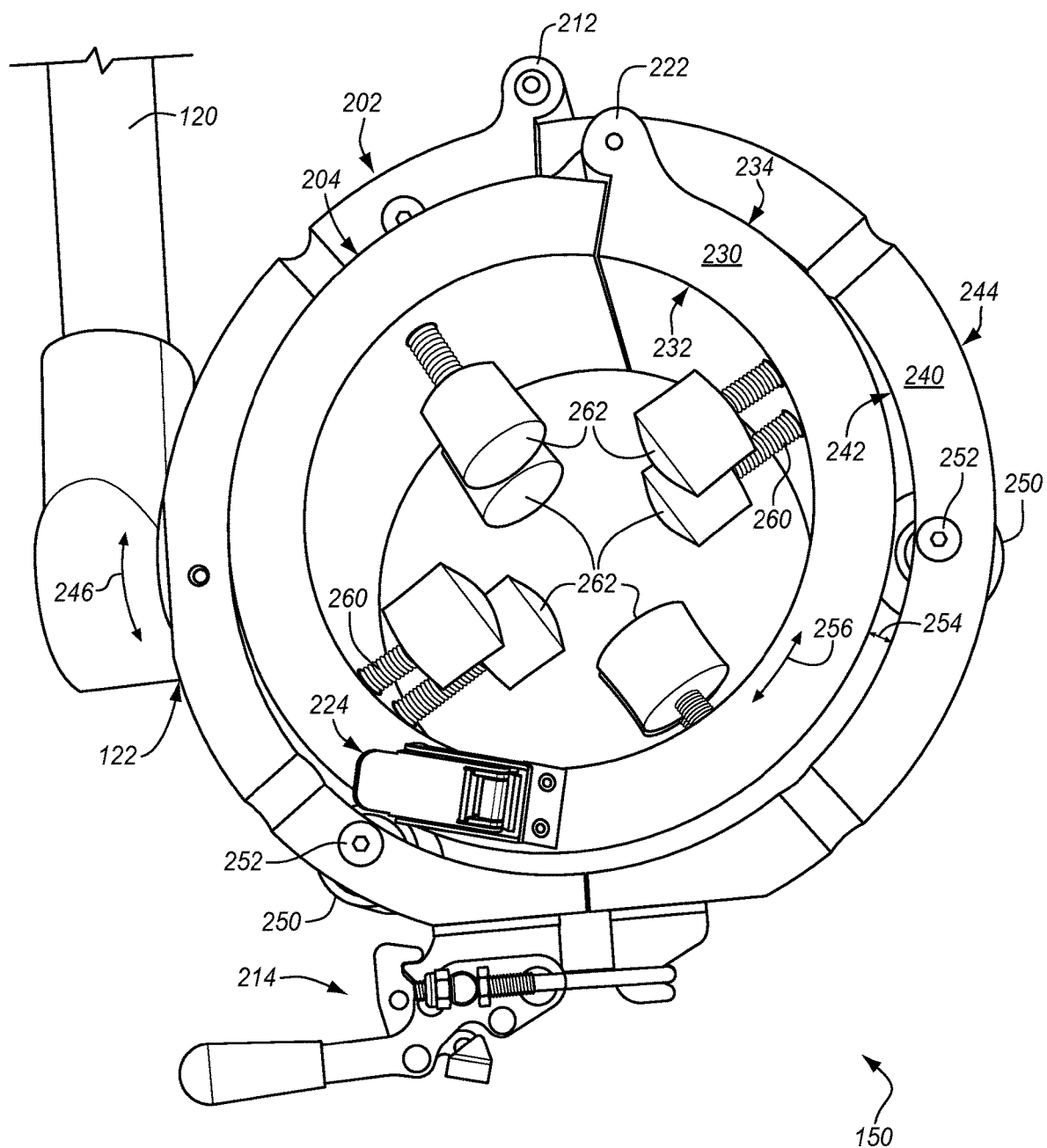
FIG. 2 is a top perspective view of a ring assembly in an illustrative embodiment.

To improve the efficiency of changing the tool in the gimbal 100, the ring assembly 150 may be enhanced as further described below. FIG. 2 is a top perspective view of the ring assembly 150 in an illustrative embodiment. The ring assembly 150 includes an outer ring 202 attached to the support member 120 (or arm) of the gimbal 100, and further includes an inner ring 204 to hold various tools (e.g., the tool 190 and other tools of various body dimensions). The inner ring 204 is rotatable within the outer ring 202. The outer ring 202 includes a hinge 212 and a latch 214 to releasably close around the inner ring 204, and the inner ring 204 includes a hinge 222 and a latch 224 to releasably close around the tool 190.

The hinges 212/222 and the latches 214/224 provide a technical benefit in that the tool 190 may be secured yet freely rotate when the outer ring 202 and the inner ring 204 are closed around the tool 190, and the tool 190 may be released without fragmenting the ring assembly 150 when the outer ring 202 and the inner ring 204 are opened. As such, in the case that it is desirable for a different tool to be secured in the ring assembly 150, it is not necessary to coordinate separate ring pieces by hand around the new tool and/or to use a separate tool and parts (e.g., screwdriver and screws) to reestablish the ring assembly 150 around the new tool. The hinges 212/222 and the latches 214/224 also enable technicians to switch tools more quickly, thereby improving factory flow time and encouraging technicians to use the gimbal 100 (which provides many safety and ergonomic benefits compared with manually supporting tools) even in instances in which a tool may be used for a brief period of time. Moreover, by eliminating or minimizing the use of separate screws and/or a screwdriver to release/secure the tool 190, the ring assembly 150 advantageously reduces the risk of foreign object debris left behind at the worksite, which may be particularly beneficial for certain factory environments such as aircraft assembly.

Additionally, as shown in FIG. 2, the latch 224 of the inner ring 204 may be mounted on a front side face 230 of the inner ring 204. The front side face 230 is a flat or substantially flat surface on a side of the inner ring 204 and may define a thickness between an inner circumference 232 and an outer circumference 234 of the inner ring 204. Similarly, the outer ring 202 includes a front side face 240 and may define a thickness between an inner circumference 242 and an outer circumference 244 of the outer ring 202. The outer circumference 244 of the outer ring 202 may be pivotably attached to the support member 120 at a joint 122 to enable a swivel 246 of the outer ring 202 about the support member 120. The outer ring 202 also includes wheels 250 and spindles 252 around its circumference to rotatably support the inner ring 204. As such, a gap 254 between the inner circumference 242 of the outer ring 202 and the outer circumference 234 of the inner ring 204 enables a rotation 256 of the inner ring 204 within the outer ring 202. With this configuration, the latch 224 advantageously enables the inner ring 204 to easily release/secure the tool 190 without interrupting the rotation 256 of the inner ring 204 and therefore allowing a full range of movement of the tool 190 in the ring assembly 150 and with the gimbal 100.

Furthermore, the inner circumference 232 of the inner ring 204 supports set screws 260 that protrude from the inner circumference 232 toward a center of the inner ring 204. Ends of the set screws 260 may be enhanced with deformable bumpers 262 that contact the body of the tool 190 (and other tools of various body dimensions) when the inner ring 204 is positioned and closed around the tool 190. The deformable bumpers 262 may include rubber or another material which deforms under contact. As such, the deformable bumpers 262 advantageously provide a secure grip for an increased range of tool body dimensions and prevent scratching of the tool bodies.

Figure 3:
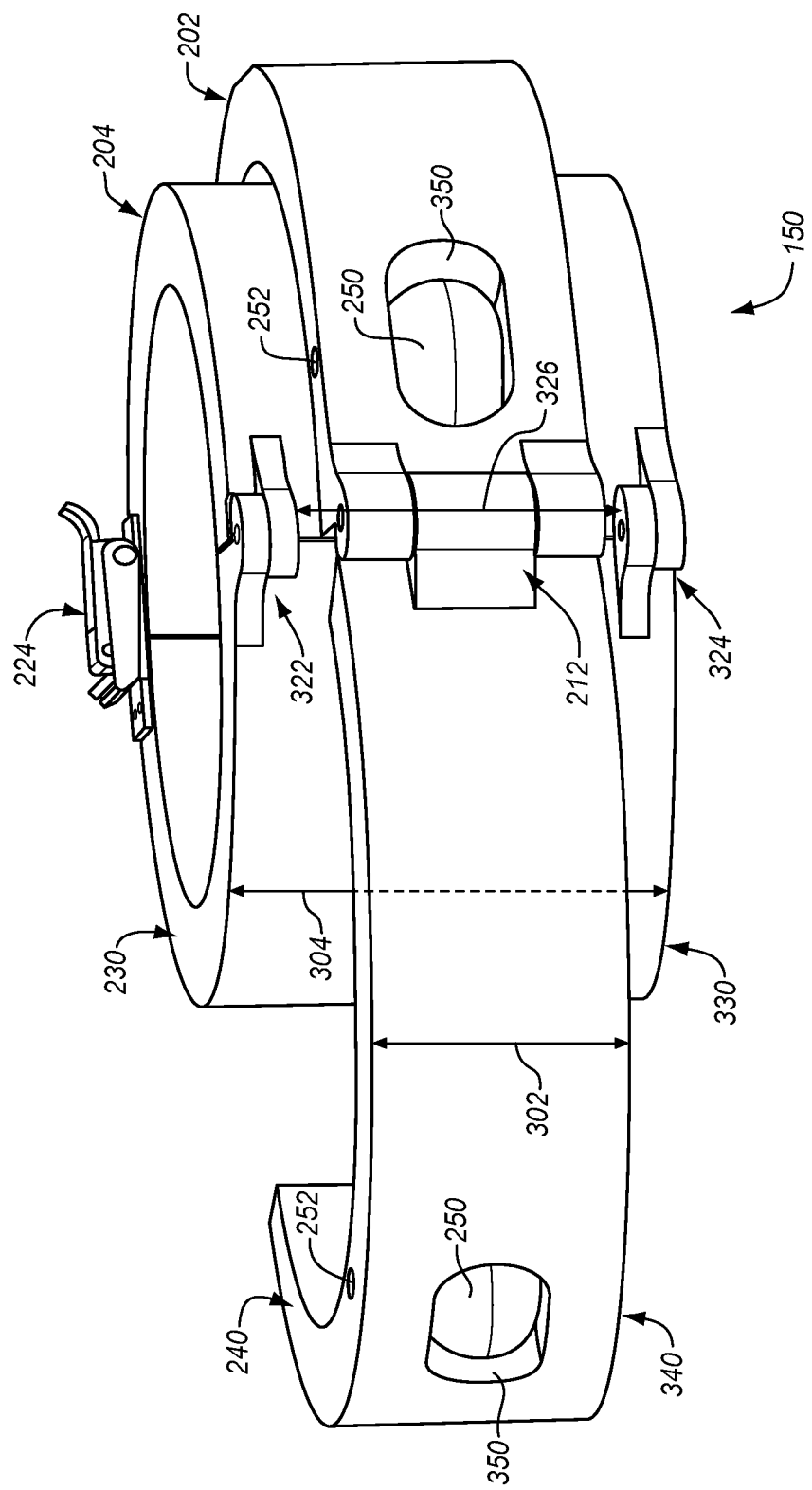
FIG. 3 is a perspective side view of a ring assembly in an illustrative embodiment.

FIG. 3 is a perspective side view of the ring assembly 150 in an illustrative embodiment. As shown in FIG. 3, the inner ring 204 may have a height 304 that is greater than a height 302 of the outer ring 202. The height 304 of the inner ring 204 is defined by a distance between the front side face 230 and a back side face 330 of the inner ring 204. Similarly, the height 302 of the outer ring 202 is defined by a distance between the front side face 240 and a back side face 340 of the outer ring 202. With this configuration, the hinge mechanism of the inner ring 204 may include two portions—a top hinge 322 situated above the front side face 240 of the outer ring 202, and a bottom hinge 324 situated below the back side face 340 of the outer ring 202. In other words, the top hinge 322 and the bottom hinge 324 are separated by a space 326 that is sized to fit the height 302 of the outer ring 202, and the top hinge 322 and the bottom hinge 324 may overlap radially with the outer ring 202. With the top hinge 322 and the bottom hinge 324 configured in such a manner, a technical benefit is provided in that the inner ring 204 is able to spin within the outer ring 202 without interference by a hinge/latch mechanism.

FIG. 3 also illustrates that the outer ring 202 may include hollow spaces 350 at locations arounds its circumference which are sized to accommodate the wheels 250. The spindles 252 may be inserted perpendicularly into the front side face 240 (and/or back side face 340) to provide a rotational axis for each of the wheels 250 in the hollow spaces 350. With the wheels 250 rotatably secured in the hollow spaces 350 in such a manner, at least a portion of each of the wheels 250 may protrude from the inner circumference 242 of the outer ring 202 to form the gap 254 between the outer ring 202 and the inner ring 204 as described above with respect to FIG. 2. With this configuration, a technical benefit is provided in that the hinge/latch mechanism of the inner ring 204 may be adequately sized to properly support relatively heavy power tools regardless of the size of space in the gap 254. In other words, dimensions of the latch 224, the top hinge 322, and/or the bottom hinge 324 may exceed dimensions of the gap 254 without interfering with the rotation of the inner ring 204 when the inner ring 204 is enclosed by the outer ring 202.

Figure 4:
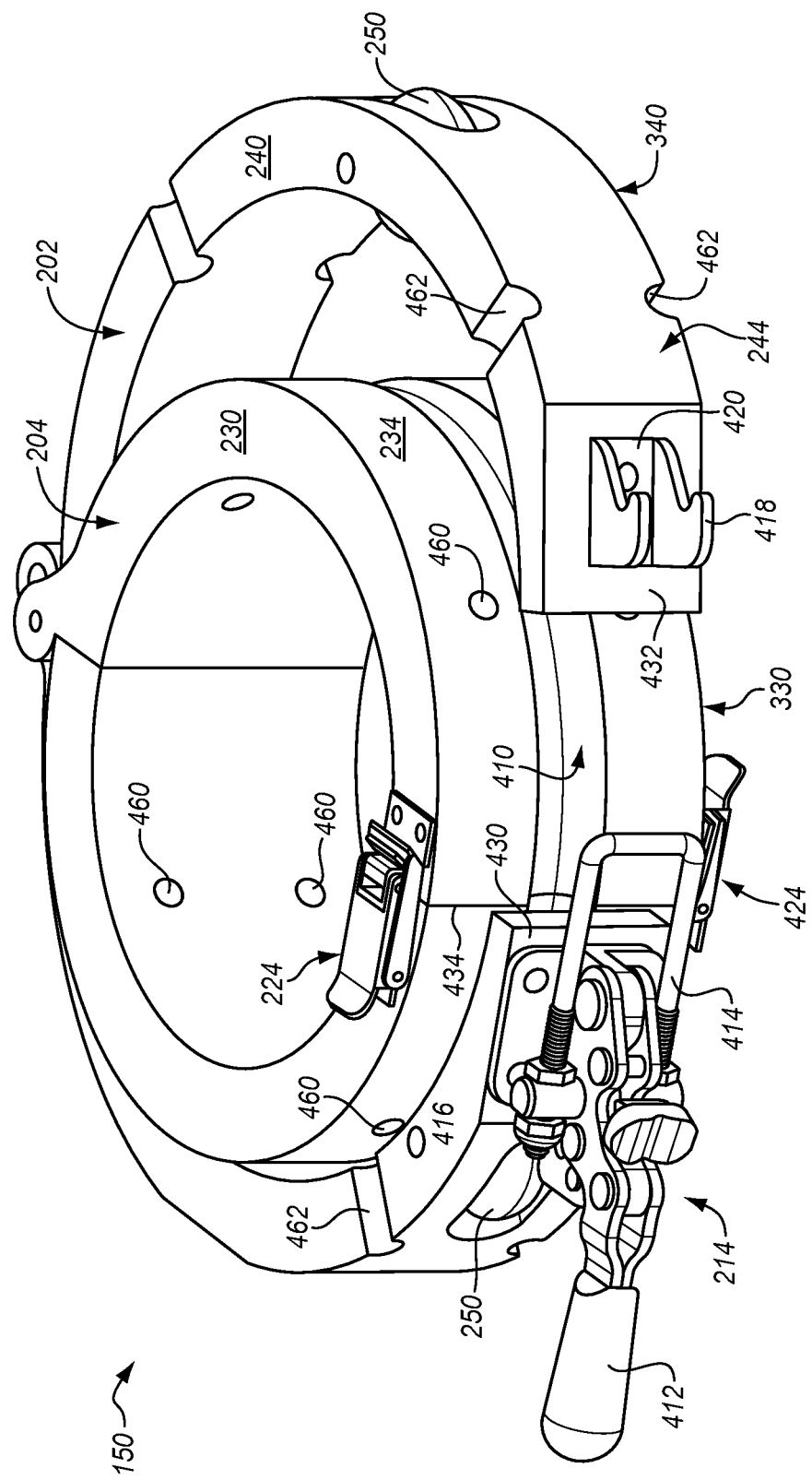
FIG. 4 is a perspective view of a ring assembly in another illustrative embodiment.

FIG. 4 is a perspective view of the ring assembly 150 in another illustrative embodiment. In this example, the latch 214 is unlocked to allow the outer ring 202 to open and release the inner ring 204. As shown here, the outer circumference 234 of the inner ring 204 includes a track 410 extending arounds its circumference that is sized to receive the wheels 250 of the outer ring 202. The track 410 may include an indented groove (e.g., grooved track) or surface that restricts the wheels 250 in directions other than the spinning direction of the wheels 250. Thus, when the outer ring 202 is properly aligned and closed around the inner ring 204, the track 410 and the wheels 250 rotatably support the inner ring 204 within the outer ring 202.

As further shown in FIG. 4, the outer circumference 244 of the outer ring 202 may include a portion which is flat or substantially flat for mounting the latch 214. In particular, components of the latch 214 including a handle 412 and a bar 414 are mounted to a first flat surface 430 via a first plate 416, and a hook 418 is mounted to a second flat surface 432 via a second plate 420. With the bar 414 properly engaged with the hook 418, the handle 412 may be pressed to lock the latch 214 and join the first flat surface 430 and the second flat surface 432 together such that a continuous or substantially continuous flat surface is formed for a portion of the outer circumference 244 of the outer ring 202 (e.g., as illustrated in FIG. 2). Similarly, by pressing the handle 412 in the opposite direction, the bar 414 may be disengaged from the hook 418 to unlock the latch 214 and allow the outer ring 202 to open yet remain intact via the hinge 212 to release the inner ring 204. It will be appreciated, however, that alternative mounting configurations, surfaces, and latching mechanisms are possible.

FIG. 4 also shows that, in addition to the latch 224 mounted on the front side face 230, the inner ring 204 may further include another latch 424 mounted on the back side face 330. Like the front side faces 230/240 described above, the back side faces 330/340 may be flat or substantially flat surfaces. Therefore, the latches 224/424 of the inner ring 204 may be mounted at its flat side surfaces such that each of the latches 224/424 bridge a split 434 in the inner ring 204. Thus, with the latches 224/424 in a locked position, the split 434 is closed and the inner ring 204 forms an enclosed ring around the tool 190. And, with the latches 224/424 unlocked, the split 434 may be opened yet the inner ring 204 may remain intact at its hinge(s) (e.g., hinge 222, or hinges 322/324) to easily release and change tools used in the ring assembly 150. Numerous variations on particular components and mechanisms of latches and hinges are possible.

Additionally, FIG. 4 illustrates that the inner ring 204 may include screw holes 460 to support the set screws 260 described earlier with respect to FIG. 2, and the outer ring 202 may include indentations 462 in the surfaces of the front side face 240 and the back side face 340 which correspond/align with the screw holes 460. The indentations 462 advantageously enable access to the set screws 260 for adjustments without unlocking or relocking either the outer ring 202 or the inner ring 204. Therefore, the ring assembly 150 may securely hold variously sized tools in the gimbal 100 with minimal down time. Moreover, the interchangeability of the ring assembly 150 described herein provides an opportunity to use different versions of the inner ring 204 in a modular fashion with the outer ring 202. For example, versions of the inner ring 204 having different sizes and/or different pre-set adjusted lengths of the set screws 260 may be made available such that a swap of the type of inner ring 204 used in the outer ring 202 can quickly accommodate a change in tools used in the gimbal 100. Further illustrative details of the operation of the ring assembly 150 will be discussed with regard to FIG. 5.

Figure 5:
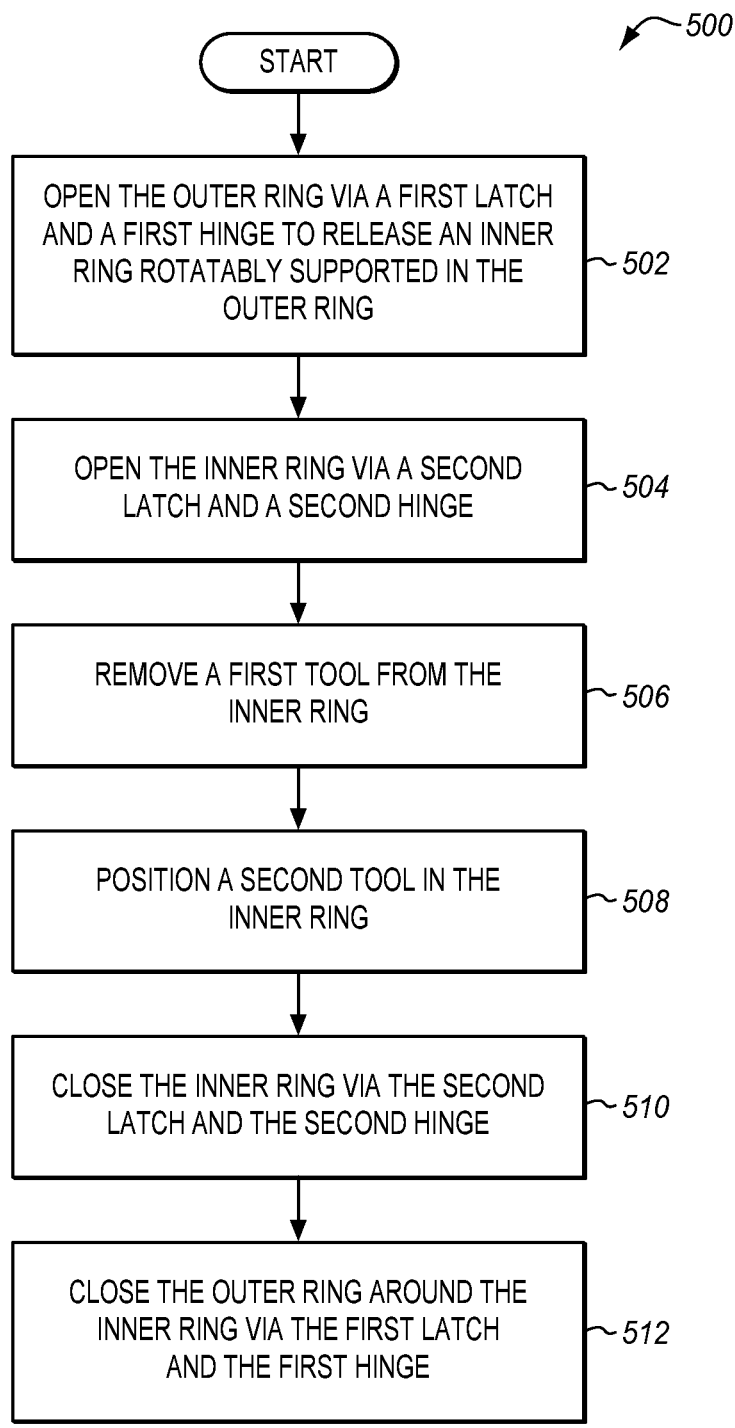
FIG. 5 is a flowchart illustrating a method for changing a tool in a gimbal in an illustrative embodiment.

FIG. 5 is a flowchart illustrating a method 500 for changing a tool in a gimbal in an illustrative embodiment. The steps of the method 500 are described with reference to the gimbal 100 of FIG. 1, but those skilled in the art will appreciate that the method 500 may be performed for other gimbals. The steps of the flowcharts described herein are not all inclusive and may include other steps not shown. The steps described herein may also be performed in an alternative order.

In step 502, the outer ring 202 opens via a first latch (e.g., latch 214) and a first hinge (e.g., hinge 212) to release the inner ring 204 rotatably supported in the outer ring 202. In step 504, the inner ring 204 opens via a second latch (e.g., latch 224) and a second hinge (e.g., hinge 222). Alternatively or additionally, the inner ring 204 may open via two latches (e.g., latch 224 and latch 424) and a second hinge (e.g., hinge 222). In step 506, a first tool (e.g., the tool 190) is removed from the inner ring 204. In step 508, a second tool (e.g., a tool with different body dimensions than the tool 190) is positioned in the inner ring 204. In step 510, the inner ring 204 is closed via the second latch (or two latches) and the second hinge. In step 512, the outer ring 202 is closed around the inner ring 204 via the first latch and the first hinge.

The method 500 provides a number of advantages over prior tool swapping techniques for gimbals. The latches of the outer ring 202 and the inner ring 204 allows for a technician to open and close the ring assembly 150 with minimal effort and use of separate tools. The hinges of the outer ring 202 and the inner ring 204 allows the outer ring 202 and the inner ring 204 to remain intact when removed. Moreover, the hinges serve to align the outer ring 202 around the inner ring 204, and align the inner ring 204 around a tool for less cumbersome assembly. Still further, the method 500 in the above-described technique allows the gimbal 100 to quickly engage with tools of various dimensions.

Although specific embodiments are described herein, the scope of the disclosure is not limited to those specific embodiments. The scope of the disclosure is defined by the following claims and any equivalents thereof.

What is claimed is:

1. An apparatus comprising:
a gimbal comprising:
an outer ring attached to an arm, the outer ring including a first hinge to open and close the outer ring, and a first latch to fasten the outer ring in a closed position; and
an inner ring rotatably supported within the outer ring, the inner ring including a second hinge to open and close the inner ring, and a second latch to fasten the inner ring in a closed position, wherein the inner ring includes set screws that protrude from an inner circumference of the inner ring, and the set screws include deformable bumpers at ends of the set screws.

2. The apparatus of claim 1, wherein the second latch is mounted to a front side of the inner ring.

3. The apparatus of claim 2, wherein the front side is a flat surface between an outer circumference and an inner circumference of the inner ring.

4. The apparatus of claim 3, wherein the inner ring includes a third latch mounted to a back side of the inner ring.

5. The apparatus of claim 1, wherein:
the second hinge includes a top hinge, a bottom hinge, and a space between the top hinge and the bottom hinge;
the space is sized to fit a height of the outer ring; and
the top hinge and the bottom hinge overlap radially with the outer ring.

6. The apparatus of claim 1, wherein the outer ring includes a plurality of wheels situated around a circumference of the outer ring to rotatably support the inner ring.

7. The apparatus of claim 6, wherein:
an outer circumference of the inner ring includes a grooved track; and
the grooved track is sized to fit the wheels to rotatably support the inner ring inside the outer ring when the inner ring and the outer ring are in the closed position.

8. The apparatus of claim 1, wherein the first latch is mounted to a flat surface portion of an outer circumference of the outer ring.

9. The apparatus of claim 1, wherein the inner ring is configured to clamp around a tool.

10. The apparatus of claim 1, wherein the outer ring includes indentations in a front side surface and a back side surface that align with holes in the inner ring that support the set screws.

11. The apparatus of claim 1, wherein the outer ring is pivotably attached to the arm.

12. A method for changing a tool in a gimbal, the method comprising:
- opening an outer ring via a first latch and a first hinge to release an inner ring rotatably supported in the outer ring;
- opening the inner ring via a second latch and a second hinge, wherein the inner ring includes set screws that protrude from an inner circumference of the inner ring, and the set screws include deformable bumpers at ends of the set screws;
- removing a first tool from the inner ring;
- positioning a second tool in the inner ring;
- closing the inner ring via the second latch and the second hinge; and
- closing the outer ring around the inner ring via the first latch and the first hinge.

13. The method of claim 12 wherein the second latch is mounted to a front side of the inner ring.

14. The method of claim 12 wherein:
- the second hinge includes a top hinge, a bottom hinge, and a space between the top hinge and the bottom hinge;
- the space is sized to fit a height of the outer ring; and
- the top hinge and the bottom hinge overlap radially with the outer ring.

15. The method of claim 12 wherein the outer ring includes a plurality of wheels situated around a circumference of the outer ring to rotatably support the inner ring.

16. The method of claim 15 wherein:
- an outer circumference of the inner ring includes a grooved track; and
- the grooved track is sized to fit the wheels to rotatably support the inner ring inside the outer ring when the inner ring and the outer ring are in a closed position.

17. The method of claim 12 wherein the first latch is mounted to a flat surface portion of an outer circumference of the outer ring.

18. A ring assembly of a gimbal, the ring assembly comprising:
- an outer ring comprising:
  - wheels situated around an inner circumference of the outer ring;
  - a first hinge mounted to the outer ring; and
  - a first latch mounted to the outer ring; and
- an inner ring comprising:
  - a track around an outer circumference of the inner ring, the track sized to receive the wheels to rotate the inner ring inside the outer ring;
  - a second hinge mounted to the inner ring;
  - a second latch mounted to the inner ring; and
  - set screws that protrude from an inner circumference of the inner ring, wherein the set screws include deformable bumpers at ends of the set screws.

19. The ring assembly of claim 18 wherein the second latch is mounted to a front side of the inner ring.

20. The ring assembly of claim 19 wherein the front side is a flat surface between the outer circumference and the inner circumference of the inner ring.

* * * * *